United States Patent [19]

Hensley

[11] 4,155,337

[45] May 22, 1979

[54] INTERNAL COMBUSTION ENGINE HAVING SYSTEM FOR REFRIGERATING FUEL INDUCTED INTO CARBURETOR

[76] Inventor: Donald W. Hensley, P.O. Box 85, Story, Ark. 71970

[21] Appl. No.: 819,869

[22] Filed: Jul. 28, 1977

[51] Int. Cl.² .................................... F02M 31/00
[52] U.S. Cl. ........................... 123/122 R; 123/122 E; 123/139 AV; 123/41.31
[58] Field of Search ............ 123/122 R, 122 E, 41.31, 123/139 AV; 261/36 A; 62/323 R

[56] References Cited

U.S. PATENT DOCUMENTS

| | | | |
|---|---|---|---|
| 2,120,779 | 6/1938 | Ericson | 123/122 R |
| 3,628,516 | 12/1971 | Perrin | 123/139 AV |
| 3,855,980 | 12/1974 | Weisz | 123/122 E |
| 3,882,692 | 5/1975 | Watanabe | 123/139 AV |

*Primary Examiner*—Ronald H. Lazarus
*Attorney, Agent, or Firm*—Grace J. Fishel

[57] ABSTRACT

A spark ignited internal combustion engine having a carburetor and a mechanical refrigeration system improved with means for cooling the fuel inducted into the carburetor.

5 Claims, 5 Drawing Figures

INTERNAL COMBUSTION ENGINE HAVING SYSTEM FOR REFRIGERATING FUEL INDUCTED INTO CARBURETOR

This invention relates to an internal combustion engine having a carburetor and a system for refrigerating fuel before it is inducted into the carburetor.

It has long been recognized as desirable to cool the air provided to a spark ignited internal combustion engine, particularly when the engine is supercharged. The cooler air inhibits spontaneous detonation in the cylinders and increases combustion efficiency by decreasing the need to use lower compression ratios to avoid knocking. This efficiency results from the greater density of the cooler air which makes more oxygen available for more complete combustion.

Many systems have been proposed for cooling the air inducted into a carburetor. None of these, however, insofar as known, utilizes a system for cooling the air by inducting refrigerated fuel into the carburetor. Another feature of the invention, it is believed, is that more of the fuel remains unvaporized up to the compression stroke in the cylinders. Thus the heat of vaporization necessary to vaporize the fuel provides additional cooling of the air at that time in the combustion cycle that cooling has the greatest effect on engine efficiency. Other objects and features of the present system will be in part apparent and in part pointed out hereinafter.

The invention accordingly comprises the constructions hereinafter described, the scope of the invention being indicated in the subjoined claims.

In the accompanying drawings, in which one of various possible embodiments of the invention is illustrated and in which corresponding reference characters refer to corresponding parts, FIG. 1 is a schematic view of a system according to the present invention for refrigerating fuel inducted into a carburetor;

Figure 1:
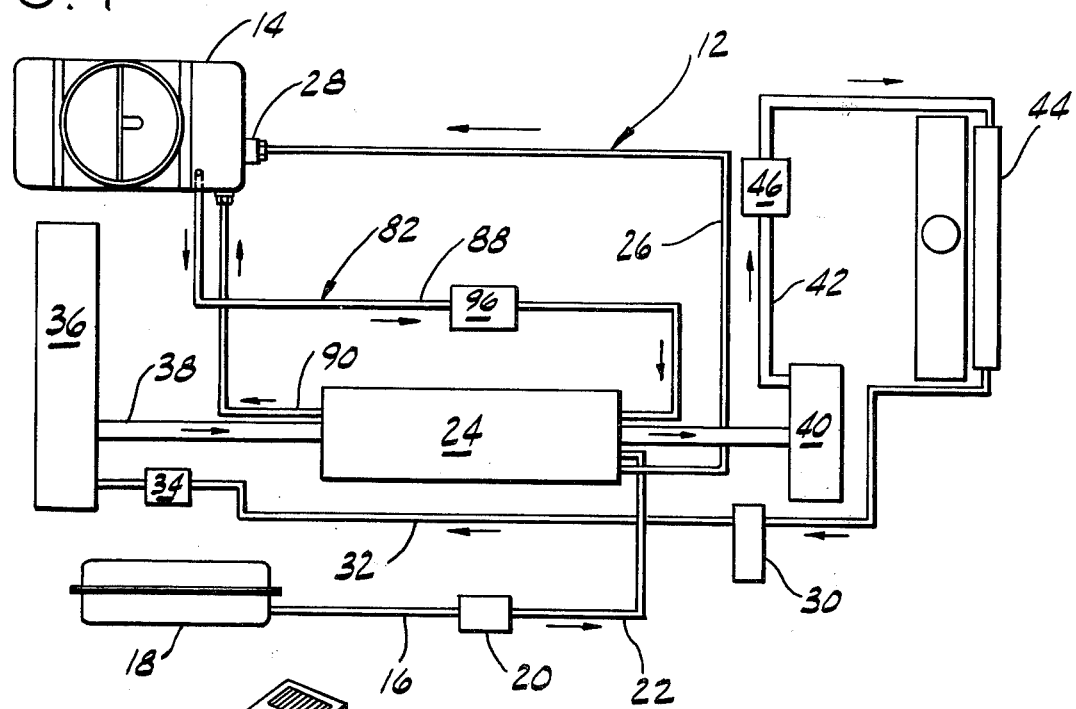

Referring to the drawings, there is shown a spark ignited internal combustion engine 10 having a system 12 for refrigerating fuel inducted into a carburetor 14.

Figure 2:
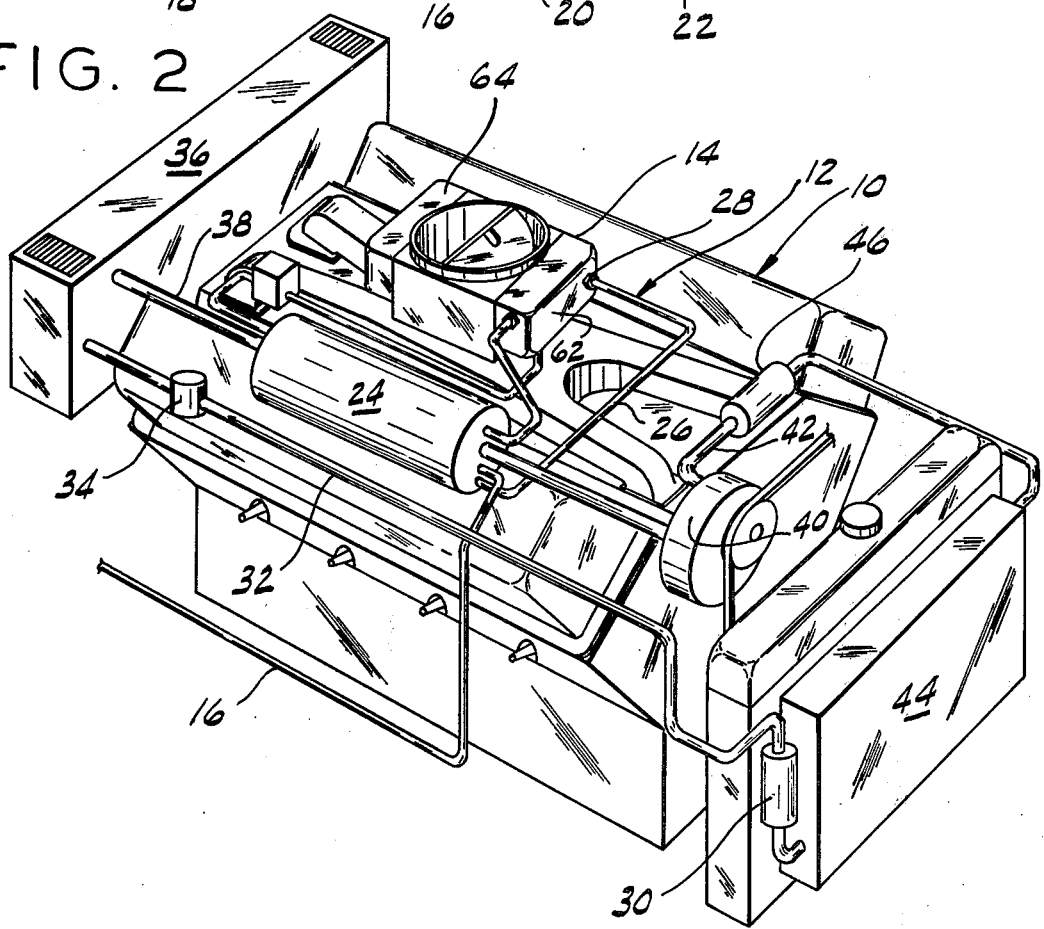
FIG. 2 is a perspective view of the system shown schematically in FIG. 1 installed on an engine having a mechanical refrigeration system.

As shown in FIGS. 1 and 2, fuel flows in the direction of the arrows through a conduit 16 from a tank 18 to a fuel pump 20. The fuel is then pumped through a conduit 22 to a heat exchanger 24 inserted in an air conditioning system. The fuel is cooled as it flows through heat exchanger 24 and is then pumped through a conduit 26 to an inlet 28 in carburetor 14.

The air conditioning system shown in FIGS. 1 and 2 preferably makes use of a fluorocarbon as a refrigerant and is conventional other than for the presence of heat exchanger 24. This system includes a drier 30 which acts as a reservoir for pressurized liquid refrigerant. From drier 30, the liquid refrigerant moves in the direction of the arrows through a high-pressure liquid line 32 to an expansion valve 34.

Expansion valve 34 admits a metered amount of refrigerant into an evaporator 36 where the refrigerant begins to vaporize. As the refrigerant vaporizes, evaporator 36 absorbs heat from a stream of air which is recirculated through the passenger compartment of the car.

The refrigerant leaves evaporator 36 as a low pressure vapor and travels through a low-pressure vapor line 38 to a compressor 40. Compressor 40 draws in the vapor through line 38 on the intake stroke and forces it through a high-pressure vapor line 42 to a condenser 44 on the compression stroke.

As the high-pressure vapor travels through condenser 44, it gives up enough heat to return to the liquid state. When the liquid leaves condenser 44, it is stored in drier 30 from which it flows and is recycled through high-pressure liquid line 32 as above described.

As shown, heat exchanger 24 is inserted in low-pressure vapor line 38 between evaporator 36 and compressor 40. In addition to cooling the fuel, exchanger 24 also serves as a muffle on the suction side to reduce pumping and line vibrations caused by the compressor. Optionally, a muffle 46 is provided in high-pressure vapor line 42 between compressor 40 and condenser 44 to break up the pressure pulses on the discharge side.

Figure 3:
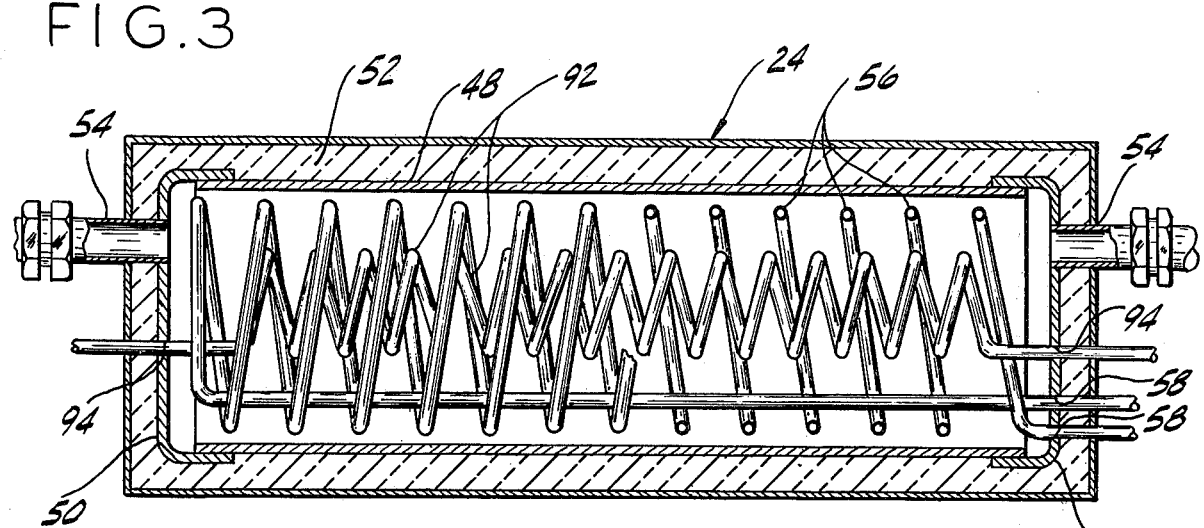
FIG. 3 is a vertical cross-sectional view of a heat exchanger for refrigerating the fuel.

As best seen in FIG. 3, heat exchanger 24 includes a cylindrical shell 48 sealed at opposite ends with end caps 50 and covered with an insulative layer 52. Heat exchanger 24 is flowably interposed in low-pressure vapor line 38 by ports 54 in end caps 50.

With continued reference to FIG. 3, a first coil 56 of heat conductive tubing is wound in spaced helical loops with a straight return along the length of and on the inside of exchanger 24. As shown coil 56 is sealed to right end cap 50 by ports 58 and flowably interconnects conduits 22 and 26.

In use with the air conditioning system operating as described above, liquid fuel flows from tank 18 through conduits 16 and 22 to heat exchanger 24 under the influence of fuel pump 20. As the fuel flows through first coil 56 in the heat exchanger, it is cooled. The fuel is then flowed through conduit 26 and inducted into carburetor 14.

As mentioned above, the particular carburetor shown in the drawings is four-barreled. Each barrel of carburetor 14 is basically a separate carburetor with a separate butterfly valve 60. In the particular construction shown, half of carburetor 14 operates as a two-barrel unit during light load and cruising speeds, while the other half is supplemental at top speed and full-throttle. The two barrels supplying fuel for light load are known as the primary side, while the other two barrels are known as the secondary side. Two separate float systems 62 and 64 are provided for the primary and secondary sides, respectively.

Figure 4:
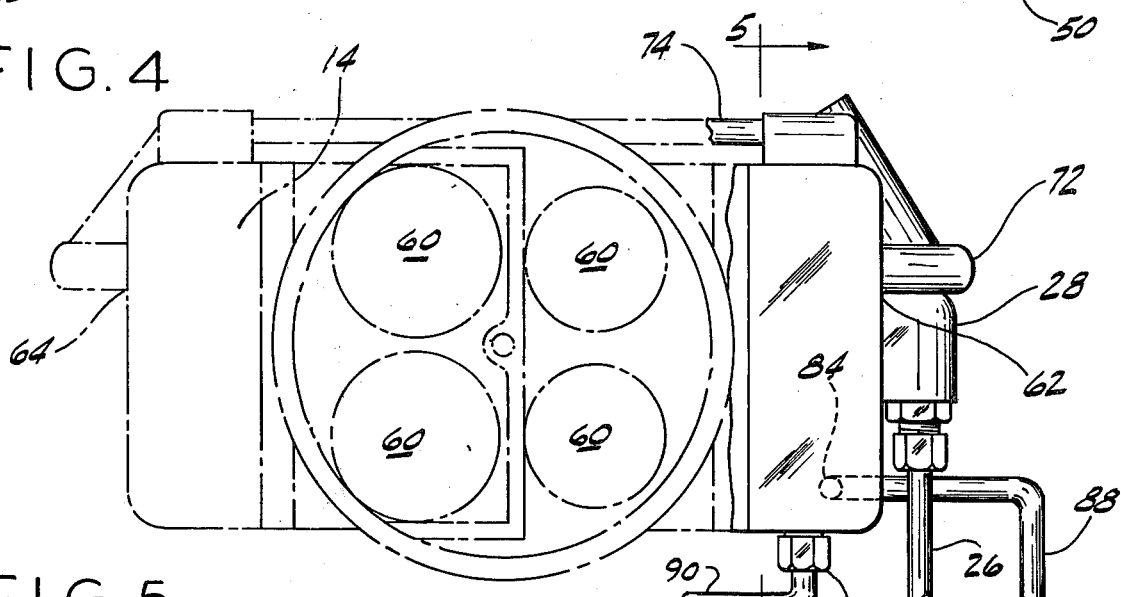
FIG. 4 is a top plan view of a four-barrel carburetor for inducting refrigerated fuel; and, FIG. 5 is a cross-sectional view taken along line 5—5 in FIG. 4.
Figure 5:
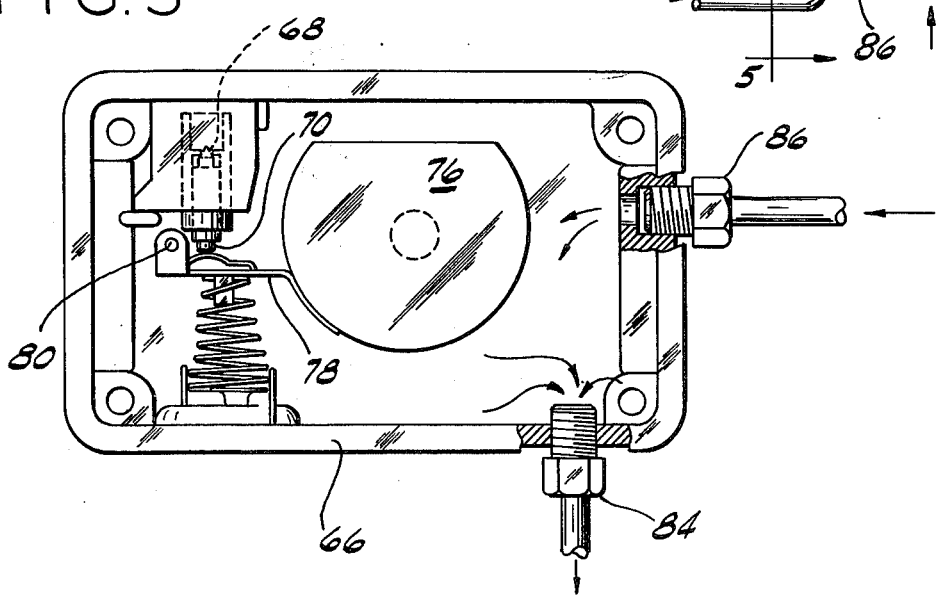

Each of primary and secondary float systems 62 and 64 has a float bowl 66 with an inlet seat 68 and a needle valve 70. As shown in FIGS. 4 and 5, carburetor inlet 28 is bifurcated into two lines 72 and 74. First line 72 is flowably connected to primary inlet seat 68 while line 74 is connected to the secondary inlet.

On each side, the refrigerated fuel enters bowl 66 through inlet seat 68. As the fuel rises in the bowl, a float 76 is lifted on a lever arm 78 below seat 68 at 80. Fuel flows through seat 68 until float 76 pushes needle valve 70 into said seat.

When the engine uses fuel, it is typically fed through a pair of main metering jets in bowl 66, one jet for each barrel, into the throat of the carburetor above butterfly valves 60. As this happens, float 76 drops, needle valve 70 is released from seat 68 and refrigerated fuel is again allowed to flow into bowl 66.

To provide refrigerated fuel to carburetor 14, it is important that first coil 56 in heat exchanger 24 be sized so that the fuel is cooled as it flows therethrough. If the coil is formed from copper and has an internal diameter of ¼inch, it has been found that a six-foot length is sufficient. Tubing of other compositions and configurations other than that shown is, of course, contemplated.

In view of the above, it will be seen that the several objects of the invention and other advantageous results are attained. More particularly, it is seen that the present invention provides refrigerated fuel for induction into a carburetor. In addition to increasing combustion efficiency and hence improving mileage and reducing pollutants, the system further mitigates vapor lock since the refrigerated fuel has little or no tendency to vaporize and block the fuel lines to the carburetor. For similar reasons, it also tends to mitigate carburetor flooding.

As various changes could be made in the above constructions without departing from the scope of the invention, it is intended that all matter contained in the above description or shown in the accompanying drawings shall be interpreted as illustrative and not in a limiting sense. For example, optional steps may be taken to maintain the fuel in refrigerated condition. To that end, conduit 26 should be as short as possible and preferably insulated. A recirculation system 82 may also be provided for recirculating the refrigerated fuel through heat exchanger 24 in primary float system 62 (as shown) or for both the primary and secondary float systems (not shown).

As shown, recirculation system 82 includes a drain outlet 84 and a recirculation inlet 86 in bowl 66. Outlet 84 is flowably connected by a conduit 88 to heat exchanger 24 and inlet 86 is connected by conduit 90. Interposed between conduits 88 and 90 is a second coil 92, which like first coil 56, is a tube helically wound on the inside of heat exchanger 24 and running the length thereof. In FIG. 3, second coil 92 is shown as wound in tighter spaced loops inside of first coil 56 and coaxial therewith. Ports 94 are provided in end caps 50 for interconnection of second coil 92 with conduits 88 and 90.

A small pump 96 is interposed in conduit 88 for recirculating the fuel in bowl 66 through the recirculating system. It is preferred that conduits 88 and 90 be short and well insulated for the same reason that these features are desirable with respect to conduit 26.

Since it is important that recirculation system 82 not effect the level of fuel in bowl 66, drain outlet 84 and recirculation inlet 86 should be positioned so that the recirculation of the fuel in the bowl has the least effect possible on float 76 and needle valve 70. For this reason, as shown in FIG. 5, outlet 84 and inlet 86 are located remote from inlet seat 68. To further reduce turbulence in bowl 66, a deflector (not shown) may be added to outlet 84 and inlet 86. While perhaps less critical, it is also important that oulet 84 and inlet 86 be positioned, as illustrated in the drawings, so as to minimize their effect on the flow of refrigerated fuel from bowl 66 through the main metering jets to the carburetor throat.

In addition to having a beneficial effect on carburetion, the present system also improves the efficiency of the refrigeration system. It can also be used when no air conditioning is wanted if a shunt (not shown) is provided at expansion valve 34 for directing the refrigerant to lowpressure vapor line 38. In this way, the present invention may be utilized in summer or winter. Other such changes and variations will occur to those skilled in the art and are encompassed by the following claims.

What is claimed is:

1. In a spark ignited internal combustion engine having a carburetor and a mechanical refrigeration system, the improvement comprising means for cooling fuel inducted into the carburetor, said means comprising a heat exchanger in heat exchange relationship with the refrigeration system and with the fuel, wherein the carburetor has a float bowl with a first inlet for fuel, said engine further including means for conducting the cooled fuel from the heat exchanger to the first inlet in the carburetor float bowl, wherein the mechanical refrigeration system includes an evaporator, a compressor and a low-pressure vapor conduit flowably interconnecting the evaporator and the compressor and wherein said heat exchanger is interposed in said conduit.

2. The engine according to claim 1 which further includes a recirculating means for recirculating fuel in the float bowl through the heat exchanger.

3. The engine according to claim 2 wherein the float bowl has a second inlet for fuel and an outlet for fuel and wherein the heat exchanger includes first and second tubes, said first tube conducting fuel to the first carburetor inlet and said second tube conducting fuel from the carburetor outlet to the second carburetor inlet.

4. The engine according to claim 3 which further includes needle valve means for controlling flow of fuel through the first inlet in the float bowl, said fuel outlet and second inlet positioned remote from said first inlet.

5. The engine according to claim 4 wherein the first and second tubes in the heat exchanger are wound in spaced helical loops along the length of and on the inside of the heat exchanger.

* * * * *